July 23, 1929.  G. EGLOFF  1,722,043
PROCESS FOR TREATING HYDROCARBONS
Original Filed Nov. 14, 1921
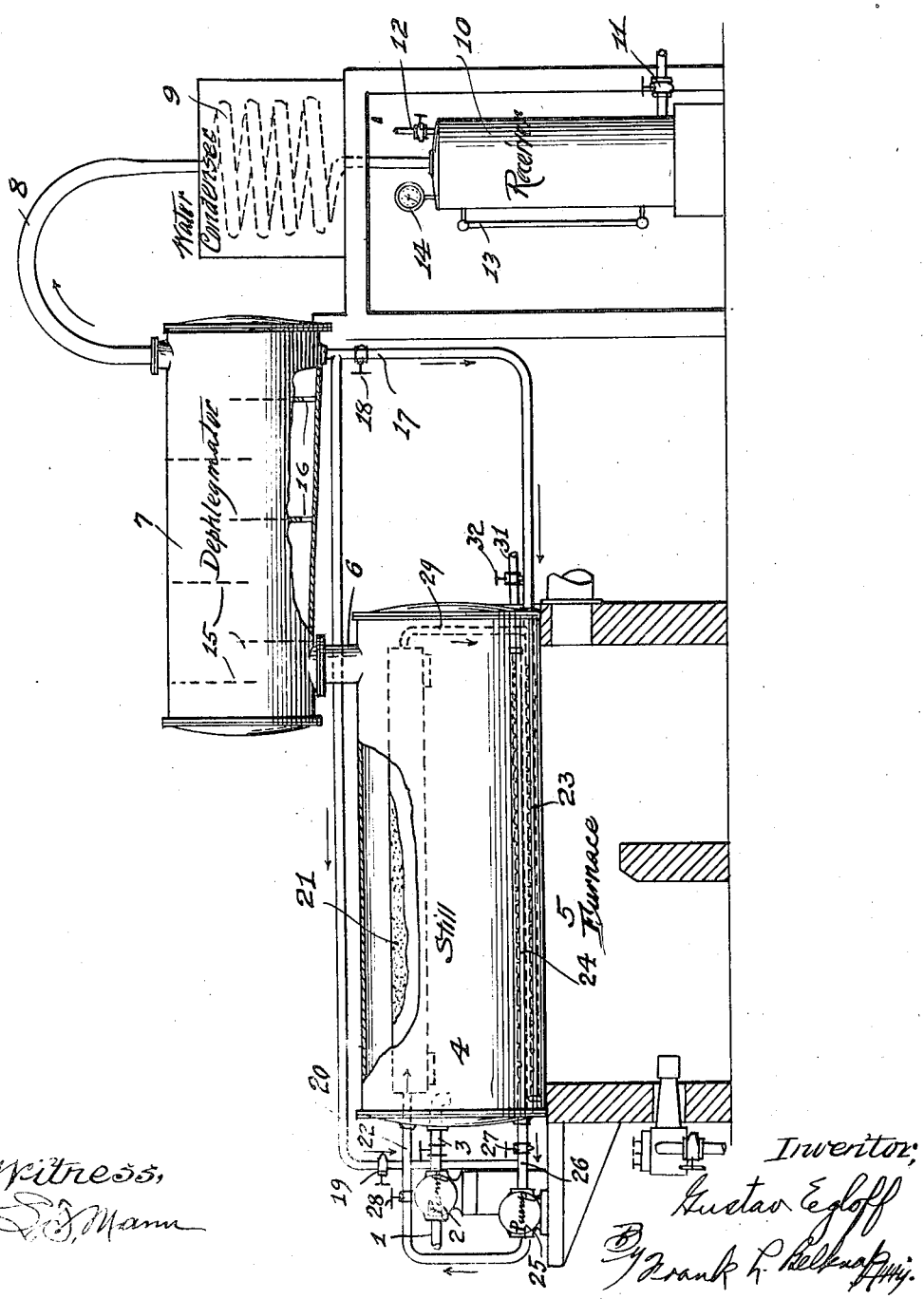

Patented July 23, 1929.

1,722,043

UNITED STATES PATENT OFFICE.

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS FOR TREATING HYDROCARBONS.

Application filed November 14, 1921, Serial No. 514,880. Renewed September 14, 1928.

This invention relates to improvements in process and apparatus for treating hydrocarbons and refers more particularly to a process in which relative high boiling point oil is converted into oil having a lower boiling point or having the characteristics of gasoline.

Among the salient objects of the invention are to provide a process in which the oil treated is converted in the still, the vapors being dephlegmated and condensed and the reflux returned for retreatment and a process in which, in addition to the conversion of the primary charge, the unvaporized portion of the oil remaining in the still is directed through a refining stage to eliminate, to a large extent, the free carbon separated during conversion and subsequent thereto is returned to the still in a refined state.

The single figure is a diagrammatic side elevational view of the apparatus.

Referring in detail to the drawing, the oil to be treated is introduced through a pipe 1 from any convenient source of supply and is charged by means of the pump 2 through the line 3, which introduces the oil to the still 4. The oil in the still is maintained at a constant level and is subjected to the heat of the furnace 5 above which it is mounted. The oil treated in the still is maintained under regulated vapor pressure and is processed to crack the oil under a substantial pressure of the generated vapor. The vapors evolved in the still pass off through the vapor line 6 to a dephlegmator 7, where they are subjected to a reflux condensing action, rising into the gooseneck 8 to a water condenser 9 and thence collected as distillate in the receiver 10. The receiver is equipped with a liquid drawoff valve 11, pressure relief pipe 12 and liquid and pressure gauges 13 and 14. The vapors passing through the dephlegmator are caused to travel in a circuitous route due to the baffle plates 15. The lower baffles are perforated next to the shell of the dephlegmator as shown at 16 so that the reflux condensate which is separated from the vapors in their travel through same will flow along the inclined lower surface of the dephlegmator to the drawoff pipe 17 regulated by a throttle valve 18. The reflux condensate may be directed by manipulation of the valves 18 and 19 in the return line 20 so that it may be returned through the pipe 20 to the filter bed 21 mounted in the top of the still through the connecting pipe 22 or by closing the valve 19 and opening the valve 18, it may be returned and introduced into the bottom of the still through the perforated pipe 23 which is nothing more than a prolongation of the return line 17. During operation, as the oil is converted, there will be a separation of free carbon which will tend to pollute the oil in the still and apparatus with an objectionable accumulation of free carbon in the bottom of the still. To obviate this collection of free carbon in the oil which is being processed, there is positioned in the bottom of the still a second perforated pipe 24 by means of which this heavier oil which collects as the oil is being treated, may be withdrawn from the bottom of the still by means of the suction pump 25. This pump, withdrawing the heavier oil from the still bottom, draws the carbon containing oil through the line 26 regulated by a valve 27 and forces it through the line 22 in which is positioned a valve 28. This discharge line 22 and suction pump 25 communicate with the filter bed 21 mounted in the upper portion of the still 4. The carbon containing oil being introduced at one end of the filter bed is caused to pass along through the filtering material such as fuller's earth, bone black or other type of cleansing agent, in this connection used. While passing through this filter bed, the oil is thoroughly divested or cleansed of the free carbon particles and passes off through the drawoff pipe 29, which communicates with the perforated end 23 of the return pipe 17. This filtered oil combines with what reflux condensate is being returned through the line 17 and bubbles up into the bottom of the still, keeping the oil which is being treated in constant agitation and preventing carbon particles from accumulating and collecting in the still bottom. The return pipe 20, as explained, furnishes a means for directing the reflux condensate back to the connecting pipe 22 where the reflux is combined with the carbon containing oil and is caused to pass through the filtering stage prior to its introduction to the still for retreatment.

The process may be operated as an alternate process, the reflux being returned directly to the still or through the filtering bed as desired. An important feature of the invention is the agitation of the oil during treatment due to the returning reflux oil being injected into the bottom of the still and the local circulation of the carbon containing oil which is withdrawn from the bottom of the still, passed through the filter bed and returned to be injected into the oil body through the perforated pipe positioned in the still bottom. This injection of clear unpolluted oil in the bottom of the still prevents the accumulation of carbon in the bottom of the still and reduces materially the fire hazard attendant on processes of this type where a considerable quantity of oil is treated in a body. A drawoff line 31 controlled by a valve 32 furnishes means for regulating the level of the oil in the still.

I claim as my invention:

1. A process for treating hydrocarbon oil, consisting in subjecting a body of oil to cracking conditions of heat and pressure in a still, in subjecting the evolved vapors to dephlegmation, in withdrawing regulated quantities of the unvaporized oil from the body of oil in the still, in combining such unvaporized oil with reflux condensate resulting from the deplegmation of the vapors, in passing the resulting mixed oil through a mass of heated filtering material, in returning the cleansed mixed oil, and injecting it into the lower portion of the oil body undergoing cracking reaction.

2. A process of cracking hydrocarbon oil, consisting in subjecting a bulk supply of oil to cracking conditions of temperature and pressure, in continuously withdrawing portions of the unvaporized oil from said bulk supply of oil, in diluting such portions by injecting thereinto an oil of lighter gravity, in passing the resulting mixed oils through a bed of filtering material, and in injecting the cleansed oil into the lower portion of the bulk supply of oil being cracked.

GUSTAV EGLOFF.